United States Patent [19]

Bousseau

[11] Patent Number: 5,033,416

[45] Date of Patent: Jul. 23, 1991

[54] INTERNAL COMBUSTION ENGINE FOR PROPELLING SHIPS THAT TRANSPORT GASEOUS FUEL

[75] Inventor: Pierre Bousseau, Courbevoie, France

[73] Assignee: S.E.M.T. Pielstick, Saint Denis, France

[21] Appl. No.: 601,640

[22] Filed: Oct. 23, 1990

[30] Foreign Application Priority Data

Oct. 25, 1989 [FR] France ................................ 89 14009

[51] Int. Cl.[5] .............................................. F02D 19/10

[52] U.S. Cl. .................................... 123/1 A; 123/575; 123/DIG. 8

[58] Field of Search ....... 123/1 A, 2, 59 EC, 142.5 R, 123/179 E, 575-578, DIG. 8, 525, 527, 27 GE

[56] References Cited

U.S. PATENT DOCUMENTS 1,080,625 12/1913 Diesel ....................... 123/DIG. 8 X
2,381,304 8/1945 Merrill ............................... 123/527
3,902,472 9/1975 Baugelin ......................... 123/179 E
4,041,910 8/1977 Houseman ................ 123/DIG. 8 X
4,335,697 6/1982 McLean .......................... 123/525 X
4,489,699 12/1984 Poehlman ............................ 123/575

FOREIGN PATENT DOCUMENTS 547894 9/1942 United Kingdom .
738451 10/1955 United Kingdom .
8401339 4/1984 World Int. Prop. O. .

*Primary Examiner*—Tony M. Argenbright
*Attorney, Agent, or Firm*—Sughrue, Mion, Zinn Macpeak & Seas

[57] ABSTRACT

An internal combustion engine for propelling ships that transport gaseous fuel, the engine comprising two groups of cylinders, a first group which is always fed with the same fuel, and a second group which is fed selectively either with said same fuel or else with a different fuel. The invention is applicable to methane tankers.

6 Claims, 1 Drawing Sheet

11
2
1
10
12
13

11
10
1
12

11
2
1
10
12
13

11
2
1
10
12
13A
13B

INTERNAL COMBUSTION ENGINE FOR PROPELLING SHIPS THAT TRANSPORT GASEOUS FUEL

The present invention relates to an internal combustion engine for propelling ships that transport gaseous fuel, and in particular methane tankers.

BACKGROUND OF THE INVENTION

In ships of this type, methane is stored in liquid form and permanent evaporation inevitably takes place during transport.

Ships exist that are fitted with engines suitable for using the evaporated natural gas. Under such circumstances, the engines use two fuels, one of them a gas and the other a liquid, with the fuels being used in variable proportions.

In practice, the use of a gas fuel at a fraction lying in the range 30% to 70% leads to abnormal combustion which is difficult to control.

The invention seeks to remedy this drawback by providing an appropriate distribution of a set of cylinders as a function of the availability of gaseous fuel, thereby ensuring that when used, the gaseous fuel is used at a fraction which ensures good combustion.

SUMMARY OF THE INVENTION

The present invention provides an internal combustion engine for propelling ships transporting a gaseous fuel, the engine being characterized in that it comprises two groups of cylinders, a first group which is always fed with the same fuel, and a second group which is fed selectively either with said same fuel or else with a different fuel.

The fuel applied to the group of cylinders which is always fed with the same fuel, is liquid. In a variant, the fuel is a gaseous fuel.

In a particular embodiment of the internal combustion engine for propelling ships transporting gaseous fuel, the engine is characterized in that it comprises three groups of cylinders with two of the groups of cylinders always being fed with the same fuel, one of said two groups being fed with a liquid fuel and the other of said two groups being fed with a gaseous fuel, the third group being fed selectively either with the liquid fuel or else with the gaseous fuel.

Advantageously, the group which is always fed with a gaseous fuel and the group which is selectively fed with the gaseous fuel are combined in a first engine, while the group which is always fed with liquid fuel constitutes a second engine.

In a particular embodiment, the group which is always fed with liquid fuel is subdivided into two groups, with each of the two engines including a respective one of the two subgroups which is always fed with liquid fuel, while the other group in the first engine is fed with gaseous fuel, and the other group in the second engine is fed selectively either with the liquid fuel, or else with the gaseous fuel.

BRIEF DESCRIPTION OF THE DRAWINGS

Embodiments of the invention are described by way of example with reference to the accompanying drawings, in which.

DETAILED DESCRIPTION

Figure 1:
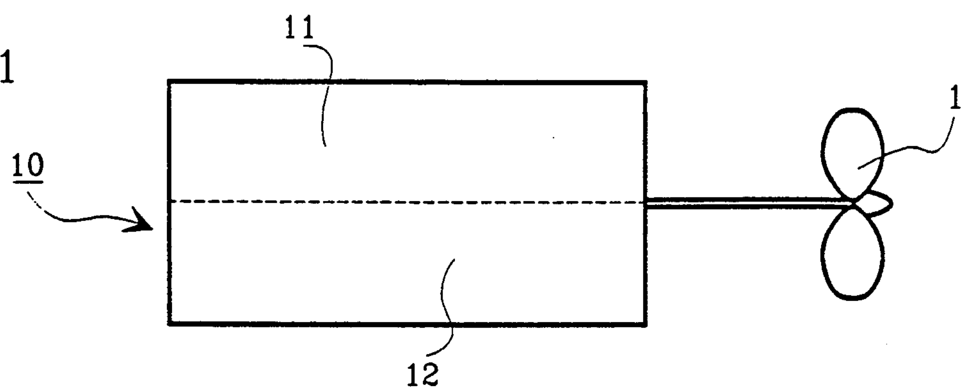
FIG. 1 shows an engine having two groups of cylinders.

In FIG. 1, the engine is given reference 10, and the propellar is given reference 1.

The engine 10 comprises two groups of cylinders 11 and 12, with one of the groups, e.g. group 11, being fed permanently with the same fuel (either a liquid or a gas), while the other group 12 is fed selectively with liquid fuel or with gaseous fuel.

In FIG. 1, the engine may be constituted, by way of example, by two rows of cylinders in a V-configuration.

Figure 2:
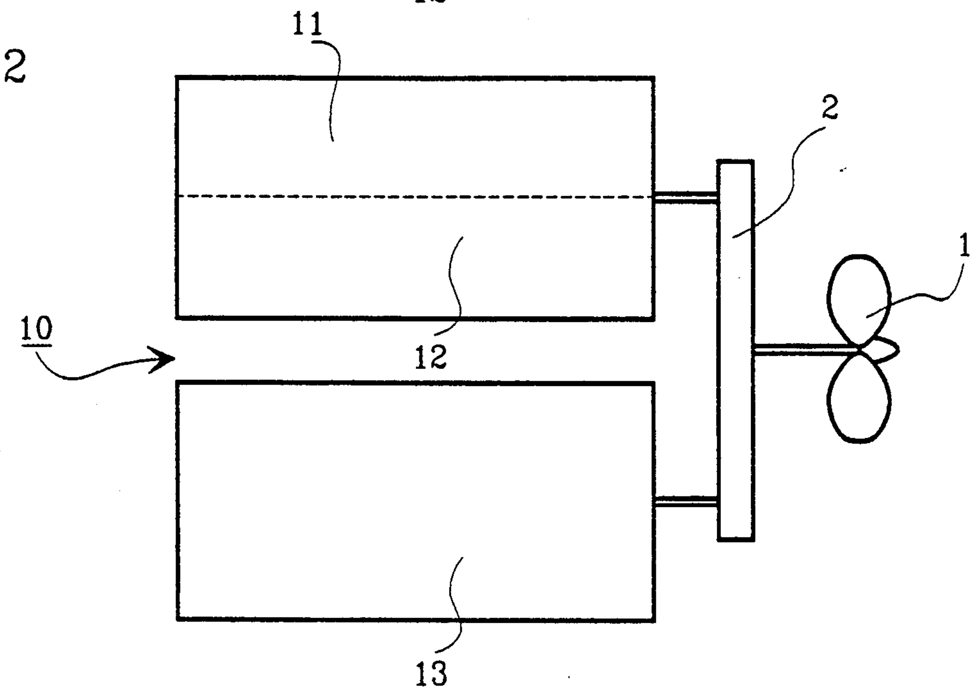
FIG. 2 shows a set of three groups of cylinders.

The assembly shown in FIG. 2 comprises three groups of cylinders: a group 11 which is fed permanently with gaseous fuel, a group 12 which is fed selectively with liquid fuel or with gaseous fuel, and a group 13 which is fed permanently with liquid fuel.

The groups 11 and 12 are combined to constitute a first engine while the group 13 on its own constitutes a second engine.

A gear box 2 transmits power from each of the engines to the propeller. Naturally, all three groups of cylinders could be combined in a single engine.

Figure 3:
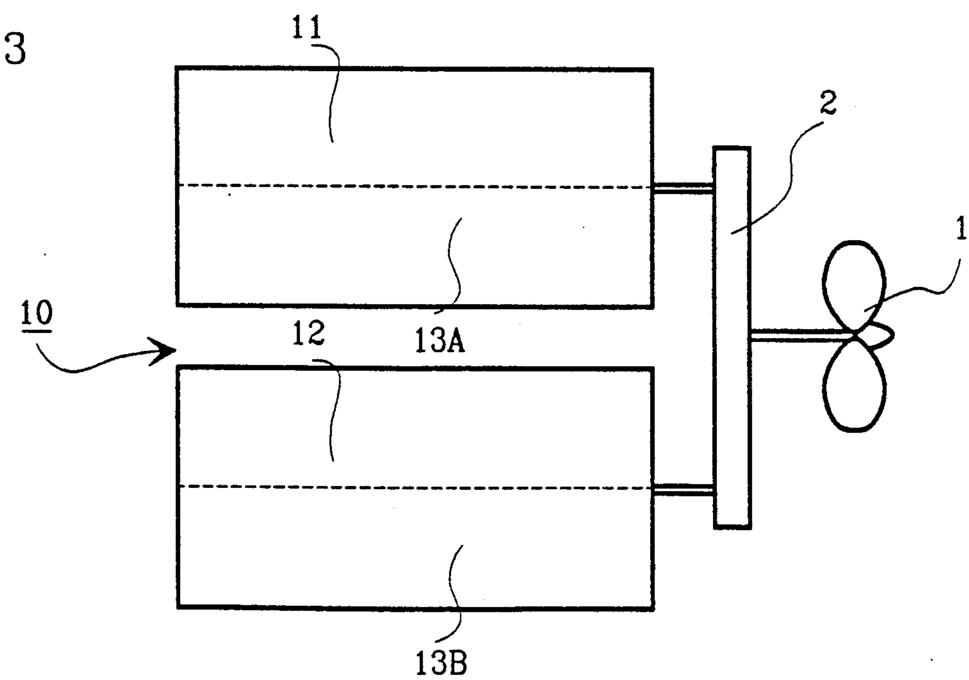
FIG. 3 shows a set of four groups of cylinders.

The assembly shown in FIG. 3 comprises four groups of cylinders associated in pairs to constitute two engines 11 and 13A, and 12 and 13B.

The groups 13A and 13B are fed with liquid fuel. Group 11 which is associated with group 13A is always fed with gaseous fuel. Group 12, associated with group 13B, is fed selectively either with liquid fuel or else with gaseous fuel.

Naturally, all four groups of cylinders could be combined, in a variant, in a single engine.

I claim:

1. An internal combustion engine for propelling ships that transport gaseous fuel, the engine comprising two groups of cylinders, a first group which is always fed with the same fuel, and a second group which is fed selectively either with said same fuel or else with a different fuel.

2. An engine according to claim 1, wherein the fuel applied to the group of cylinders which is always fed with the same fuel, is liquid.

3. An engine according to claim 1, wherein the fuel applied to the group of cylinders which is always fed with the same fuel, is gaseous.

4. An internal combustion engine for propelling ships that transport gaseous fuel, the engine comprising three groups of cylinders with two of the groups of cylinders always being fed with the same fuel, one of said two groups being fed with a liquid fuel and the other of said two groups being fed with a gaseous fuel, the third group being fed selectively either with the liquid fuel or else with the gaseous fuel.

5. An engine according to claim 4, wherein the group which is always fed with a gaseous fuel and the group which is selectively fed with the gaseous fuel are combined in a first engine, while the group which is always fed with liquid fuel constitutes a second engine.

6. An engine according to claim 5, wherein the group which is always fed with liquid fuel is subdivided into two groups, with each of the two engines including a respective one of the two subgroups which is always fed with liquid fuel, while the other group in the first engine is fed with gaseous fuel, and the other group in the second engine is fed selectively either with the liquid fuel, or else with the gaseous fuel.

* * * * *